Nov. 22, 1932. E. F. DAVIS Re. 18,661

METHOD OF MAKING SPLINED GEARS

Original Filed Aug. 7, 1930

INVENTOR.
Ernest F. Davis,
BY
Hood & Hahn.
ATTORNEYS

Reissued Nov. 22, 1932 Re. 18,661

UNITED STATES PATENT OFFICE

ERNEST F. DAVIS, OF MUNCIE, INDIANA, ASSIGNOR TO WARNER GEAR COMPANY, OF MUNCIE, INDIANA, A CORPORATION OF INDIANA

METHOD OF MAKING SPLINED GEARS

Original No. 1,789,968, dated January 27, 1931, Serial No. 473,647, filed August 7, 1930. Application for reissue filed September 30, 1932. Serial No. 635,622.

The object of my invention is to produce a splined gear having hardened teeth wherein the splined portion is more accurate than has heretofore been considered commercially practical, the production of said gear involving the new and improved method of heat treatment and quenching.

Figure 1:
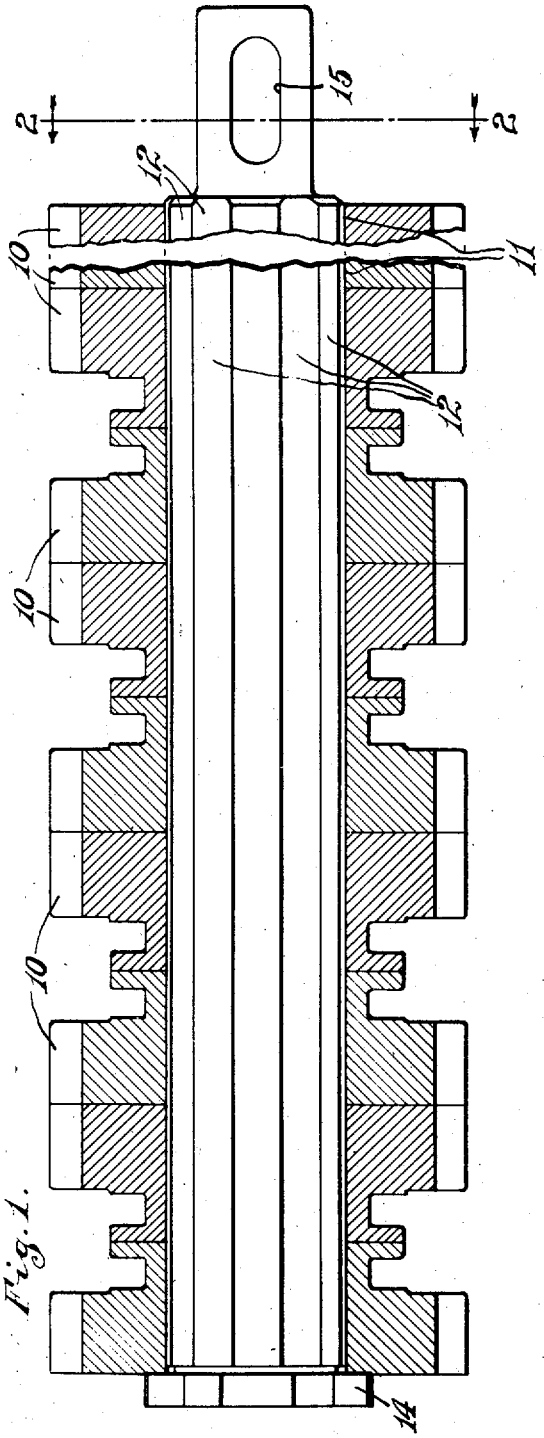
Figure 2:
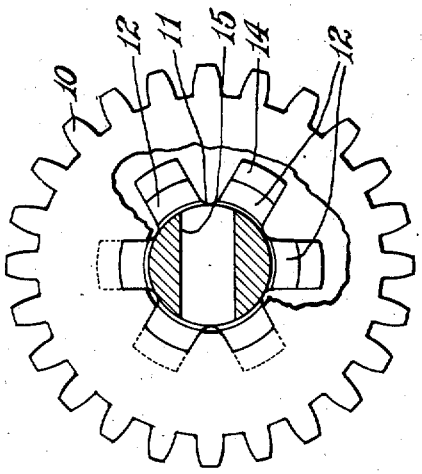

The accompanying drawing illustrates a special carrier and an associated group of gears, Fig. 1 being an axial section; and Fig. 2 a cross-section on line 2—2 of Fig. 1.

My invention contemplates the initial production of gears 10 of unhardened material capable of being hardened by a heating and quenching manipulation and these gears have their splined portions produced by a broaching operation which reduces the splined portions to within a few thousandths of the ultimate desired dimensions.

A group of these gears is then assembled upon a carrier 11 formed of a non-oxidizing material having a coefficient of expansion considerably lower than the coefficient of expansion of the gear material and having splines 12 thereon which fit the splined portion of the gears with such a degree of closeness that, when the carrier and its associated group of gears is subjected to the necessary heat treatment, the splined surfaces of the gears will be free to expand and contract under the heat treatment and such that when the heated group is projected into the quenching bath, say a cyanide bath, the flow of the bath into contact with the splined surfaces of the gears will be materially retarded although not entirely prevented.

In order to accomplish this result, I have found that satisfactory results may be produced by using a carrier of chrome-nickel alloy which has a very low coefficient of expansion. This plug is conveniently provided at one end with a retaining flange 14 and at the other end with a perforation 15 through which a sustaining hook may be projected.

In operation a group of the green gears is placed upon the holder; the assembly is then subjected to the necessary heat treatment; and then, suspended from its perforated end, is lowered into the quenching bath. The quenching results in a hardening of the teeth of the gears to the desired extent and, because of the retarded quenching of the splined portions of the gears, due to the retarded flow of the bath to these portions and the heat of the holder, the splined surfaces of the gears, while hardened sufficiently to meet commercial requirements of these portions of the gear, are not hardened to an extent equal to the teeth. The splined portions of the gears being free to expand and contract under the heat treatment, the teeth are not so distorted as they would be if the splined portions were held against expansion and contraction and undesirable internal stresses are not set up within the bodies of the gears, and the splined portions come out of the bath at a degree of hardness which permits a finishing broaching, which may be accomplished economically, so that the splined portions may be readily finished to the degree of accuracy required.

I claim as my invention:

1. The process of producing splined gears which comprises the formation of a gear of a specified material with the splined surfaces thereof reduced closely to the desired dimensions, the placing of said gear upon a splined holder, the subjection of said holder and gear to a heat treatment, the subjection of the heated holder and the gear to a quenching bath, and the subsequent removal of material at the splined surfaces of the gear to reduce said surfaces to ultimate dimensions, the holder having such dimensions and such coefficient of expansion that the splined surfaces of the gear will be free to expand and contract during heat treatment and such that the flow of quenching bath to said splined surfaces will be retarded but not ultimately prevented whereby the splined surfaces of the gear upon emergence from the quenching bath will be less hard than the teeth thereof and in condition to permit, as by a broaching operation, the removal of material therefrom for a final finishing operation.

2. The process of producing splined gears which comprises the formation of gears of a specified material with the splined surfaces thereof reduced closely to the desired dimensions, the placing of said gear upon a splined holder, the subjection of said holder and gear to a heat treatment, the subjection of the heated holder and gear to a quenching bath, and the subsequent removal of material at the splined surfaces of the gear to reduce said surfaces to ultimate dimensions, the holder being formed of non-oxidizing material and having such dimensions and such coefficient of expansion that the splined surfaces of the gear will be free to expand and contract during heat treatment and such that the flow of quenching bath to said splined surfaces will be retarded but not ultimately prevented whereby the splined surfaces of the gear blank, upon emergence from the quenching bath will be less hard than the teeth thereof and in condition to permit as by a broaching operation, the removal of material therefrom for a final finishing operation.

3. The process of producing articles having openings extending therethrough and having their outer surfaces hardened, which comprises the formation of the article of a specified material with the opening reduced closely to the desired dimensions, the placing of the said article upon a holder extending through its opening, the subjection of said holder and article to a heat treatment, the subjection of the heated holder and article to a quenching bath and the subsequent removal of the material of the surfaces of the opening to reduce said surfaces to ultimate dimensions, the holder having such dimensions that the quenching action of the bath will be retarded at the surfaces of the opening, whereby the surfaces of the opening in the article upon emergence from the quenching bath will be less hard than the outer surfaces of the article and in condition to permit, as by a broaching operation, the removal of material therefrom for final finishing operation.

4. The process of producing articles having openings extending therethrough and having their outer surfaces hardened which comprises the formation of the article of a specified material with the opening reduced closely to the desired dimensions, the placing of said article upon a holder extending through said opening, the subjection of said holder and article to a heat treatment, and the subjection of the heated holder and article to a quenching bath and the subsequent removal of the material of the surfaces of the opening to reduce said surfaces to ultimate dimensions, the holder having such dimensions and such coefficient of expansion that the surfaces of the opening will be free to expand and contract and the quenching action of the bath will be retarded at the surfaces of the opening, whereby the surfaces of the opening in the article upon the emergence from the quenching bath will be less hard than the outer surfaces of the article and in condition to permit, as by a broaching operation, the removal of material therefrom for a final finishing operation.

5. The process of producing articles having an opening extending therethrough and having their outer surfaces hardened which comprises the formation of the article of a specified material with the opening reduced closely to the desired dimensions, the placing of the article upon a holder extending through the opening, the subjection of said holder and article to a heat treatment, the subjection of the heated holder and article to a quenching bath and the subsequent removal of the material of the surfaces of the opening to reduce said surfaces to ultimate dimensions, the holder having means thereon to retard the quenching action of the bath at the surfaces of the opening, whereby the surfaces of the opening upon emergence from the quenching bath will be less hard than the outer surfaces of the article and in condition to permit, as by a broaching operation, the removal of material therefrom for a final finishing operation.

6. The process of producing articles having openings extending therethrough and having their outer surfaces hardened which comprises the formation of the article of a specified material with the opening reduced closely to the desired dimensions, the placing of said article upon a holder which extends through the opening, the subjection of the holder and article to a heat treatment, and the subjection of the heated holder and article to a quenching bath, and the subsequent removal of the material of the surfaces of the opening to reduce said surfaces to ultimate dimensions, the holder having such coefficient of expansion that the surfaces of the opening will be free to expand and contract during heat treatment and having means thereon to retard the quenching action of the bath at the surfaces of said opening, whereby the surfaces of said opening upon the emergence from the quenching bath will be less hard than the outer surfaces of the article and in condition to permit, as by a broaching operation, the removal of material therefrom for a final finishing operation.

7. The process of producing articles having openings extending therethrough and having their outer surfaces hardened which comprises the formation of the article of a specified material with the opening reduced closely to the desired dimensions, the placing of said article upon the holder which extends through said opening, the subjection of said holder and article to a heat treatment, the subjection of the heated holder and article to a quenching bath and the subsequent removal of the material of the surfaces of the opening to reduce said surfaces to ultimate dimensions, the dimensions and configuration of the holder conforming to the configuration of the opening and being such that the quenching action of the bath will be retarded at the surfaces of the opening, whereby the surfaces of the opening in the article upon emergence from the quenching bath will be less hard than the outer surfaces of the article and in condition to permit, as by a broaching operation, the removal of material therefrom for a final finishing operation.

8. The process of producing articles having an opening extending therethrough and having their outer surfaces hardened which comprises the formation of the article of a specified material with the opening reduced closely to the desired dimensions, the placing of said article upon a holder which extends through said opening, the subjection of said holder and article to a heat treatment, the subjection of the heated holder and article to a quenching bath, and the subsequent removal of the material of the surfaces of the opening to reduce said surfaces to ultimate dimensions, the holder having such coefficient of expansion and so conforming to the configuration of an opening that the surfaces of the opening will be free to expand and contract during heat treatment and the quenching action of the bath will be retarded at the surfaces of the opening, whereby the surfaces of the opening upon emergence from the quenching bath will be less hard than the outer surfaces of the article and in condition to permit, as by a broaching operation, the removal of material therefrom for a final finishing operation.

In witness whereof, I, Ernest F. Davis, have hereunto set my hand at Muncie, in the county of Delaware, State of Indiana, this 21 day of September, 1932.

ERNEST F. DAVIS.